(12) United States Patent
Wang et al.

(10) Patent No.: US 11,049,249 B2
(45) Date of Patent: Jun. 29, 2021

(54) METHOD, APPARATUS AND SYSTEM FOR CELL DETECTION

(71) Applicants: Providence University, Taichung (TW); National Tsing Hua University, Hsinchu (TW)

(72) Inventors: Wei-Chung Wang, Hsinchu (TW); Yung-Hsiang Chen, Chiayi County (TW); Chuan-Yi Tang, Hsinchu (TW); Ching-Huan Kuo, Taipei (TW)

(73) Assignees: PROVIDENCE UNIVERSITY, Taichung (TW); NATIONAL TSING HUA UNIVERSITY, Hsinchu (TW)

( * ) Notice: Subject to any disclaimer, the term of this patent is extended or adjusted under 35 U.S.C. 154(b) by 104 days.

(21) Appl. No.: 16/683,339

(22) Filed: Nov. 14, 2019

(65) Prior Publication Data
US 2020/0167924 A1 May 28, 2020

(30) Foreign Application Priority Data
Nov. 28, 2018 (TW) ................... 107142496

(51) Int. Cl.
*G06K 9/00* (2006.01)
*G06T 7/00* (2017.01)
(Continued)

(52) U.S. Cl.
CPC .......... *G06T 7/0014* (2013.01); *G02B 21/365* (2013.01); *G06K 9/0014* (2013.01);
(Continued)

(58) Field of Classification Search
CPC ............ G06K 9/0028; G06K 9/00127; G06K 9/6267; G06T 2207/30024;
(Continued)

(56) References Cited

U.S. PATENT DOCUMENTS

2003/0184730 A1* 10/2003 Price .................. G06T 5/50
356/39
2005/0207633 A1* 9/2005 Arini .................. G01N 21/6458
382/133

(Continued)

*Primary Examiner* — Guillermo M Rivera-Martinez
(74) *Attorney, Agent, or Firm* — Li & Cai Intellectual Property (USA) Office

(57) ABSTRACT

A method, an apparatus and a system for cell detection are provided. In the apparatus, a hyperspectrum module is used to capture information across electromagnetic spectrums from an image, a stereo camera module is used to capture three-dimensional image information, and the hyperspectrum module and the stereo camera module form a trinocular micro spectrometer. A microscopic optical module is provided for the two modules to form hyperspectrum and three-dimensional image information from a cell and its split cells via a lens. In the method, a series of continuous images are obtained within a time period. An observation image array with a plurality of observation image zones are provided to retrieve coordinates of a plurality of feature points at different times. Finally, a holistic cellular activity can be obtained by analyzing continuous hyperspectrum and 3D image information from the images over time.

20 Claims, 9 Drawing Sheets

(51) Int. Cl.
  *G06T 7/246* (2017.01)
  *G02B 21/36* (2006.01)
  *H04N 13/204* (2018.01)

(52) U.S. Cl.
  CPC .......... *G06K 9/00134* (2013.01); *G06T 7/248* (2017.01); *G06T 2207/10012* (2013.01); *G06T 2207/10056* (2013.01); *G06T 2207/30044* (2013.01); *H04N 13/204* (2018.05)

(58) Field of Classification Search
  CPC ......... G06T 2207/10056; G06T 7/0012; G06T 2207/10016; G06T 17/00; G06T 2207/10012; G06T 7/0014
  See application file for complete search history.

(56) References Cited

U.S. PATENT DOCUMENTS

| | | | |
|---|---|---|---|
| 2011/0092762 A1* | 4/2011 | Wong | G06T 7/0012 600/34 |
| 2011/0216953 A1* | 9/2011 | Callahan | G06K 9/00 382/128 |
| 2015/0204728 A1* | 7/2015 | Liu | G01N 15/1429 356/497 |
| 2018/0211380 A1* | 7/2018 | Tandon | G06K 9/6271 |
| 2019/0226972 A1* | 7/2019 | Javidi | G03H 1/0443 |
| 2019/0384048 A1* | 12/2019 | Valdes | G02B 21/06 |
| 2021/0050094 A1* | 2/2021 | Orringer | G16H 30/40 |

* cited by examiner

METHOD, APPARATUS AND SYSTEM FOR CELL DETECTION

CROSS-REFERENCE TO RELATED PATENT APPLICATION

This application claims the benefit of priority to Taiwan Patent Application No. 107142496, filed on Nov. 28, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is generally related to a technology of cell detection, and more particularly to a method, an apparatus and a system for detecting cell activity.

BACKGROUND OF THE DISCLOSURE

A monitoring technology adapted to monitoring cells such as embryo is a very important issue in the field of biotechnology. One of the goals of development of the biotechnological industry is to measure deformation of a cell structure efficiently, conveniently and effectively.

Conventional instruments used to measure cell displacement can be categorized into a contact-type instrument and a non-contact-type instrument. A contact-type displacement measurement technology requires a reference point set up along a displacement direction, and needs to calibrate the instrument. After setting up the reference point, a probe of the instrument is also set up at another measurement point. Then, a relative movement between the reference point and the measurement point can be obtained from a change of position of the probe. However, in the contact-type measurement method, it is challenging to provide an appropriate reference point for the measurement instrument. Further, the instrument is configured to contact the measurement point, which makes the contact-type measurement technology more restrictive.

On the other hand, most non-contact measurement technologies use optical theory when conducting measurements. For example, a signal source of the optical system is set up at a measurement point. The signal source can be a laser, an LED, a camera or the like. A relative displacement can be obtained by detecting change of a position of the signal source. However, the non-contact measurement technology still requires a reference point that is fixed for further comparison. Although the non-contact measurement technology needs not contact the measurement point of the cell, a dead zone in the measurement may still be present.

Furthermore, even though the displacement of cell can be measured by a conventional laser optical sensing technology, errors may still occur in the measurement due to divergent laser spots or unstable signal sources.

SUMMARY OF THE DISCLOSURE

The disclosure is related to a cell detection method, an apparatus and a system thereof. One of the objectives of the method, the apparatus and the system is to obtain stereoscopic information of a cell via a stereo camera to avoid an image dead zone in a planar image caused by stacking of split cells. A holistic cell image can be obtained, and the holistic cell image allows the system to determine a state of the cell more accurately. In the meantime, a hyperspectrum of the cell can be captured via a common-path so as to obtain image values over a plurality of spectral channels. Therefore, the cell can be split more meticulously, and the accuracy of image recognition can be enhanced.

According to one of the embodiments, a cell detection method is provided. In the method, a process of cell division from a cell to split cells through a coordinate system of feature-positioning points is described. A series of continuous images within a period of time by a cell detection apparatus can be obtained. After that, coordinates of a plurality of feature-positioning points at a first time within every observation image zone are obtained so as to create a reference image. By referring to the reference image, coordinates of the plurality of feature-positioning points at a second time within the observation image zones are also obtained. Further, the changes of the plurality of feature-positioning points before and after a specific time within every observation image zone can be obtained. A deformation vector map can be established according to the changes of the plurality of feature-positioning points within the plurality of observation image zones in an observation image array. Therefore, cell activities at the first time and the second time can be obtained. Thus, a holistic cellular activity is obtained according to changes of hyperspectrum and three-dimensional image information within the plurality of observation image zones over time.

Furthermore, a region of interest can be obtained from the images covering the cell and the split cells so as to create an image of the observation image array.

In one embodiment of the disclosure, the cell detection apparatus includes a hyperspectrum module and a stereo camera module. The cell detection apparatus obtains hyperspectrum and three-dimensional image information of a plurality of observation image zones of an observation image array covering split cells from a cell via a common-path.

Furthermore, the cell detection apparatus captures images within a continuous wavelength band for depicting a spectrum of pixels within a region of interest. The apparatus also performs spectral classification, merging and de-mixing for differentiating unused information from images of the cells within every observation image zone so as to improve image and data quality.

A cell detection system is provided in the disclosure. The system includes the above-mentioned cell detection apparatus and a computer system. With the hyperspectrum and three-dimensional image information of the cell and the split cells generated by the cell detection apparatus, a processor of the computer system performs the cell detection method.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1A:
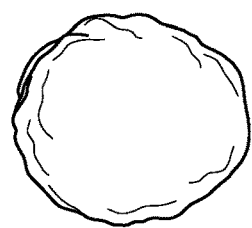
FIGS. 1A to 1E are schematic diagrams depicting a scenario where information regarding cell activity of cell division is obtained in one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a method, an apparatus and a system for cell detection. The cell detection system is essentially implemented by an optical system that primarily includes a hyperspectrum module and a stereo camera module. The hyperspectrum module and the stereo camera module form a trinocular micro spectrometer for perform cell detection via a common-path. The stereo camera module is used to capture three-dimensional image information from a cell and split cells, and the three-dimensional image information allows the system to provide more accurate detection results. The hyperspectrum module can be used to retrieve information across electromagnetic spectrums from an image including the cell and the split cells. Image data can be incorporated to a digital image correlation method for calculating the cell activity such as mechanical analysis in cell division through hyperspectrum and stereoscopic information obtained by the optical system.

The cell detection method, the apparatus and the system provide a non-contact measurement technology for changes of cell. The hyperspectrum and the stereoscopic information cooperate with a software-based image analysis technology for measuring relative movement of the cell more accurately. The system provides a service of remote observation via a network system.

The hyperspectrometer provided in the system generates a hyperspectral image that is able to be meticulously segmented in a spectral dimension. The hyperspectrometer not only distinguishes grayscale, red, green and blue of the image, but also provides data of multiple channels in the spectral dimension. For example, the wavelength 400 nm to 1000 nm of the spectrum can be segmented into 300 channels. The data obtained by the hyperspectrometer can be represented by a data cube. The data cube has information of the image and can be expanded on the spectral dimension. Therefore, spectral data with respect to every point of the image can be obtained, and image signals for any spectral segment can also be obtained. When a hyperspectral image is imaged in a space, dozens to hundreds of data of the spectral channels are recorded with the same spatial resolution. After superposing the data of the spectral channels, a hyperspectral image cube is formed. Each of the pixels of the hyperspectral image cube created by the hyperspectrometer corresponds to a continuous spectral curve. After processing the hyperspectral image, the spatial information of the image can be used and information of the spectrum is used to improve quantitative analysis. Therefore, detectability of specimen such as the cell can be effectively enhanced.

The stereo camera may adopt a digital photographing technology and is able to position specific marks at a plurality of measurement positions for the cell image. The marks can be indicative of measurement marks. The system continuously records positions of the measurement marks at different times. Therefore, displacements of the measurement marks can be calculated. Further, the cell detection system adopts the stereo camera or any other photographing technology capable of generating the stereoscopic information that is able to obtain the cell activity more accurately.

When obtaining the cell activity, e.g., displacement or deformation, by the image analysis technology, a mechanical analysis approach can also be used. For example, if the cell is an embryo, an embryo mechanical analysis can be introduced. According to one embodiment of the cell detection method, the cell detection system is used to capture a series of cell images within a period of time and activities of measurement points. A time lapse video created by the series of cell images can be created. In the meantime, a digital image correlation method is incorporated for performing a three-dimensional biological mechanical analysis upon the cell. Further, an artificial intelligence approach for biomedical image recognition technology can also be involved.

One of the objectives of the cell detection method is to determine cell activity with an image-processing technology and to screen out the cells in compliance with one or more specific conditions. For example, for a purpose of cell screening, defects of the cells should be determined in advance. Especially, positions, shapes and sizes of the defects should be obtained. For example, a series of embryo images over five days are firstly obtained, and then, based on some observation standards, a state of the embryo can be observed and screened before implanting the embryo into a mother. When the embryo in compliance with certain requirements (e.g., strong vitality and normal genes condition) can be screened out in advance, an embryo implantation rate and a live birth rate can be improved.

References are made to FIGS. 1A to 1E which show the schematic diagrams depicting circumstance of the cell detection method, apparatus and system adapted to detect the cell activity in a cell division process.

Figure 1B:
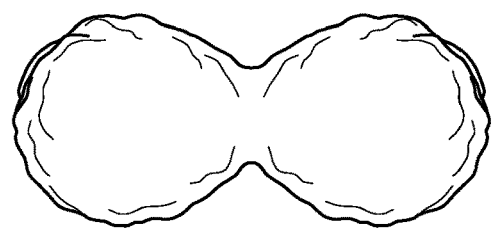
Figure 1C:
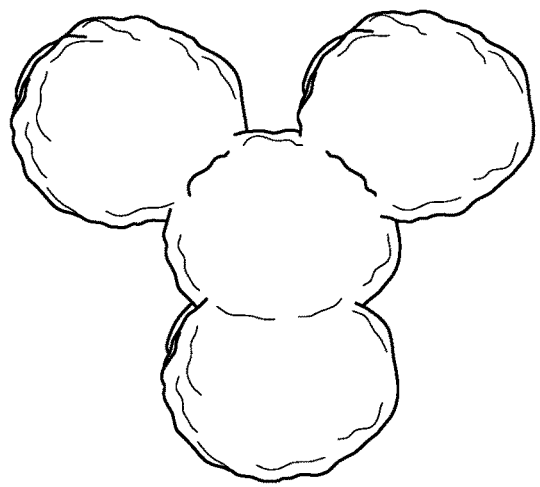
Figure 1D:
Figure 1E:

FIG. 1A schematically shows a microscopic image indicative of an initial state of a cell. After a period of time, the cell is split into two cells as shown in FIG. 1B. The two cells are further split into four cells as shown in FIG. 1C. At this moment, as shown in FIG. 1D, the cells may be stacked up in a pile. As shown in FIG. 1E, when the cells continuously split into eight cells, they are even more likely to be stacked up. Thus, a misjudgment may occur if the system merely relies on a plane image to determine the cell activity. Therefore, the cell detection system of the disclosure uses a stereoscopic image to observe changes of vertical displacements of the split cells when the cells are split into four or more cells. The stereoscopic image of the split cells allows the system to observe dead zones that the conventional technology cannot observe.

Based on the circumstances described above, it is acknowledged that the system may not screen the cells correctly if some features of the cells cannot be detected from a plane image. The system is particularly applicable to an embryo in an artificial pregnancy process, especially for screening an embryo sac at a golden period from day one to day five. The solution provided in the cell detection system of the disclosure is able to provide correct information for embryo screening through hyperspectrum and stereoscopic information.

Figure 2:
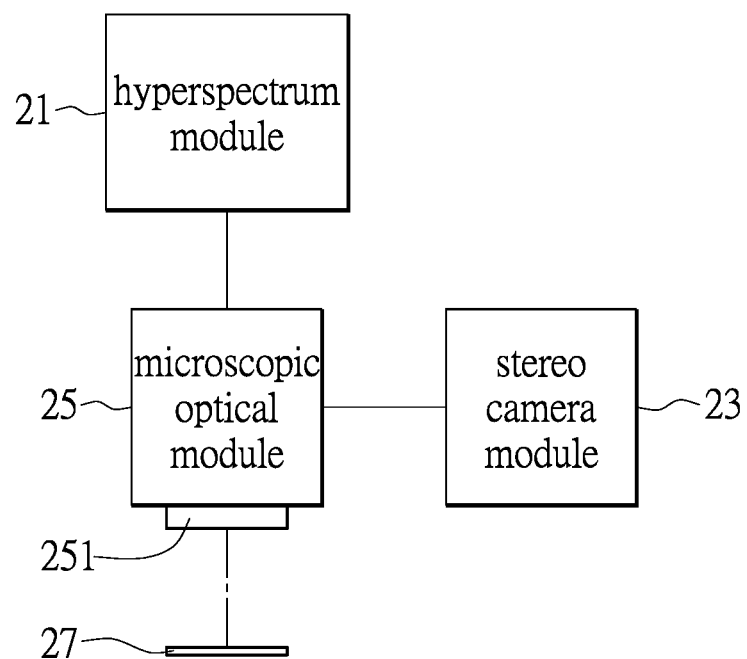
FIG. 2 is a schematic diagram depicting a cell detection apparatus according to one embodiment of the disclosure.

Reference is made to FIG. 2 which shows a schematic diagram depicting a cell detection apparatus in one embodiment of the disclosure.

Main components of the cell detection apparatus shown in the diagram include a hyperspectrum module 21, a stereo camera module 23 and a microscopic optical module 25. The modules 21, 23 and 25 constitute a trinocular micro spectrometer that is used for image processing via a common-path. The trinocular micro spectrometer uses images generated by the hyperspectrum module 21 and three-dimensional image information formed by at least two images captured by the stereo camera module 23 to conduct cell detection via a common-path.

The hyperspectrum module 21 is primarily used to retrieve information across electromagnetic spectrums. Besides visible lights, the hyperspectrum module 21 can process images of invisible lights such as infrared and ultraviolet. The cell detection apparatus retrieves the information across electromagnetic spectrums with the hyperspectrum module 21. Therefore, the cell can be inspected through different bands of electromagnetic spectrum. Spectral properties of the cell can be used to identify a state of cell activity and allows the cell detection system to obtain a more accurate result.

One of the embodiments of the stereo camera module 23 adopts a camera with a dual-lens module that essentially includes a lens and a photosensor. The lenses of the dual-lens module have a distance difference from each other for simulating parallax between two human eyes. Therefore, two images can be obtained from a specimen at the same time. There is a disparity between the two images, and the disparity allows the system to produce three-dimensional image information of the specimen. The three-dimensional image information includes information of a plane image and a vertical image. For a purpose of cell detection, the three-dimensional image information allows the system to obtain cell activity more accurately.

The microscopic optical module 25 is one of the optical mechanisms of the cell detection apparatus. The microscopic optical module 25 allows the hyperspectrum module 21 and the stereo camera module 23 to obtain a hyperspectral image and the three-dimensional image information of the specimen, e.g., the cell and the split cells, carried by a specimen carrying unit 27 via the common-path by a structural design lens set 251. Therefore, trinocular image information of the cell(s) can be obtained.

Figure 3:
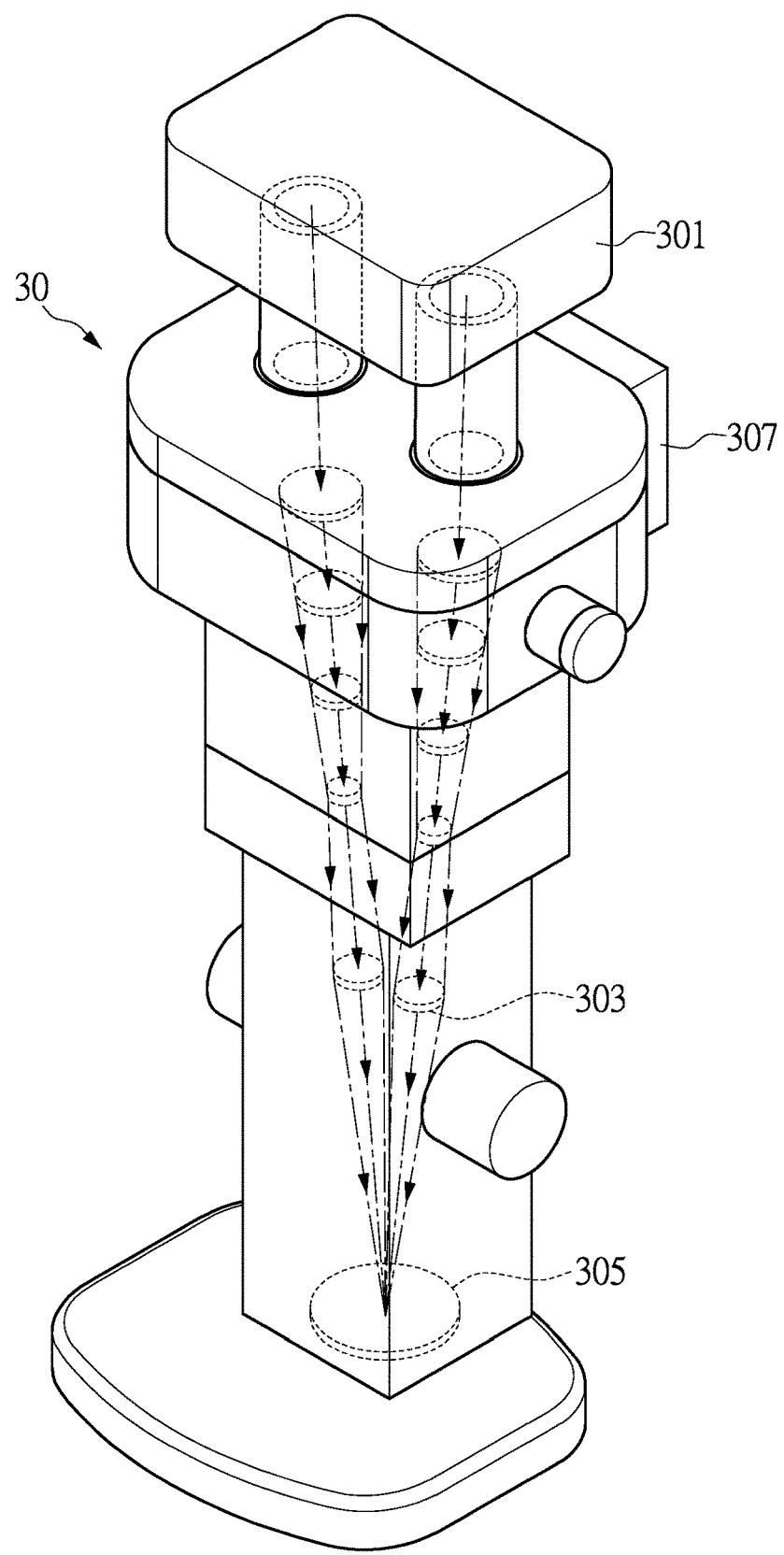
FIG. 3 is another schematic diagram depicting the cell detection apparatus in another embodiment of the disclosure.

FIG. 3 is a schematic diagram depicting the cell detection apparatus in one embodiment of the disclosure. A cell detection apparatus 30 shown in the diagram includes a dual-lens stereo camera 301 that is able to retrieve three-dimensional image information of the specimen carried by the specimen carrying unit 305 within a focal length by an optical structure 303. Further, with a hyperspectrum module 307 of the apparatus, the hyperspectral image and three-dimensional image information of the cell can be obtained by the optical structure 303 via a common-path.

Figure 4:
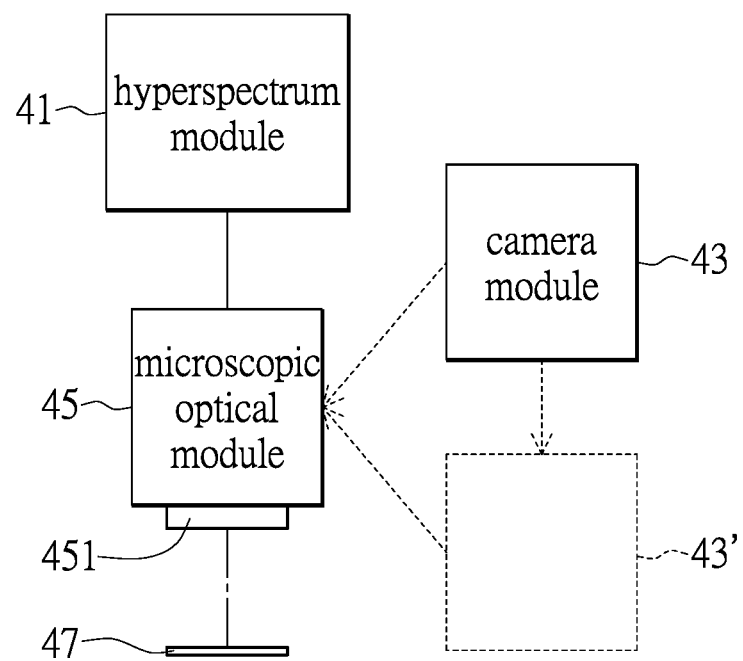
FIG. 4 is one further schematic diagram depicting the cell detection apparatus according to one further embodiment of the disclosure.

FIG. 4 is another schematic diagram depicting the cell detection apparatus in one further embodiment of the disclosure.

The cell detection apparatus includes a hyperspectrum module 41 that is able to obtain the hyperspectrum of the specimen carried by a specimen carrying unit 47 via a microscopic optical module 45 and a lens 451. A stereo camera module can be a camera module having a lens set. An image of an angle of view of the specimen at a first position 43 can be obtained by the microscopic optical module 45 and the lens 451. Another image of another angle of view of the specimen at a second position 43' can be obtained and three-dimensional image information of the specimen can also be obtained.

For obtaining the three-dimensional image (or stereoscopic image) of the cell and its split cells, the cell images of at least two angles of view can be obtained and then reproduced as a three-dimensional image of the cell. The cell images of at least two angles of view can be taken at multiple positions by a camera, or taken at the same time by multiple cameras.

The cell detection apparatus according to the above-described embodiments performs a cell detection method through a computer system. A processor of the computer system executes a software program for operating a cell detection method. In the method, a digital image correlation method (DIC) is performed. The cell detection apparatus obtains hyperspectrum and three-dimensional image information of the cell so as to decide feature-positioning points for detecting the cell activity. An image-processing process can also be used to determine changes of the cell over time.

Figure 5:
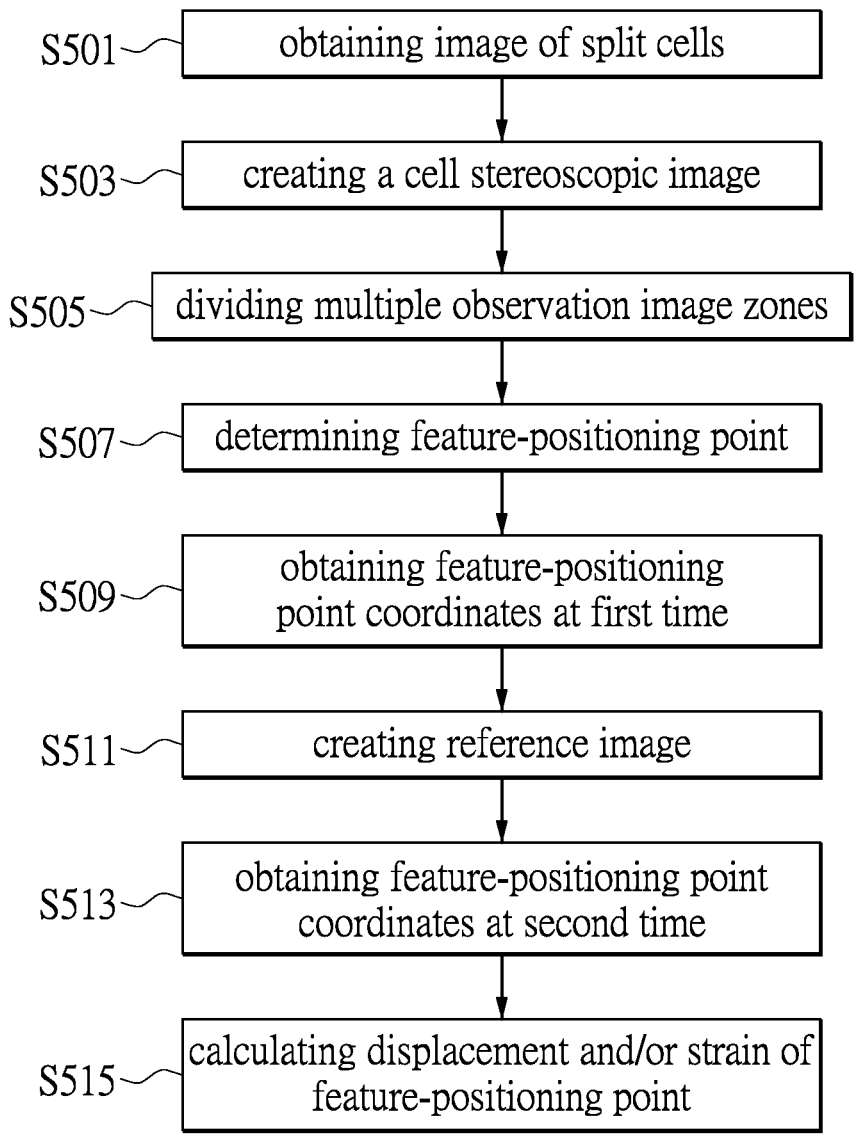
FIG. 5 shows a flow chart describing a cell detection method according to one embodiment of the disclosure.

Reference is made to FIG. 5 which shows a flow chart describing the cell detection method operated in the cell detection apparatus according to one embodiment of the disclosure.

When describing a cell growth mechanics (e.g., an embryo), a depth layer is stacked on the image of the cell(s) in the process of a three-dimensional cell analysis. The cell detection method conducts a cell mechanical analysis so as to create a series of continuous images within a period of time. The continuous images form a time lapse video of the series of cell images. Therefore, the continuous hyperspectrum and three-dimensional image information of the cell can be obtained. For detecting the activities of cell division, such as in step S501, images in the process of cell division during a period of time can be obtained. In step S503, the hyperspectrum and the three-dimensional image of the cell can be used to create a precise three-dimensional cell image.

In one embodiment of the disclosure, such as in step S505, the three-dimensional image information of the cell can be divided into multiple observation image zones in accordance with calculation needs or an actual image distribution. In every observation image zone, the displacement and relative change of the cell at a specific position can be determined, so that a holistic cellular activity can be obtained. Furthermore, when the system obtains hyperspectrum of the cell, image values over a plurality of spectral channels can be obtained for more meticulous segments in order to improve the accuracy of image recognition.

In one aspect of the disclosure, such as in step S507, at least two figure-positioning points are set within each of the observation image zones. The feature-positioning points may be position-identifiable light-and-shade spots, color blocks or lines that can be numbered. In step S509, the cell detection system uses a software approach to analyze images within the observation image zone so as to obtain the identifiable positions therein. The coordinates of one or more feature-positioning points can be configured at a first time. In step S511, the images related to the feature-positioning points at the first time are referred to so as to establish a reference image. After that, in step S513, the cell detection system uses a software approach to analyze the observation image zone at a second time for obtaining coordinates of the one or more feature-positioning points therein. In step S515, a displacement of every feature-positioning point from the first time to the second time can be calculated, and then the changes of feature-positioning points over time can be obtained. Accordingly, a strain of the holistic cellular activity can also be obtained.

FIG. 6A through FIG. 6E are schematic diagrams showing that the digital image correlation method is used to describe the one or more feature-positioning points over time.

Figure 6A:
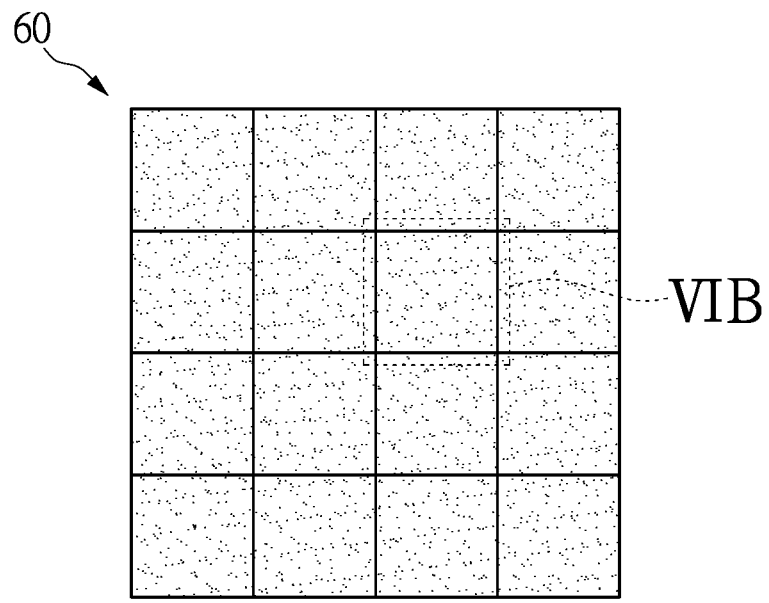
FIGS. 6A to 6E are schematic diagrams depicting a digital image correlation method used to describe the changes of feature-positioning points over time in one embodiment of the disclosure.

FIG. 6A is a schematic diagram depicting a planar graph of a series of continuous images of multiple cells, including a cell and its split cells, within a period of time, taken by a cell detection apparatus. The cell detection apparatus essentially includes a hyperspectrum module and a stereo camera module. The cell detection apparatus retrieves hyperspectrum and three-dimensional image information from multiple observation image zones of an observation image array via a common-path. The observation image array has multiple observation image zones that include a cell and its split cells.

Figure 6B:
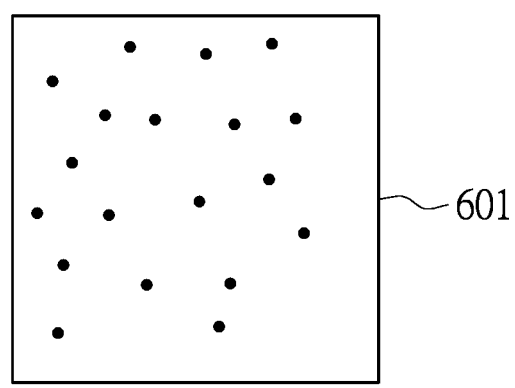

According to one of the embodiments of the disclosure, a cell image can be taken at a first time. The cell image forms an M×N observation image array 60 that covers multiple observation image zones. The cell detection system sets up at least two feature-positioning points according to image features of every observation image zone. An observation image zone 601 (VIB) can be shown schematically, and magnified as the diagram shown in FIG. 6B. The diagram of FIG. 6B shows four feature-positioning points that form reference coordinates that are used to describe the cell activities in each of the observation image zones 601.

Figure 6C:
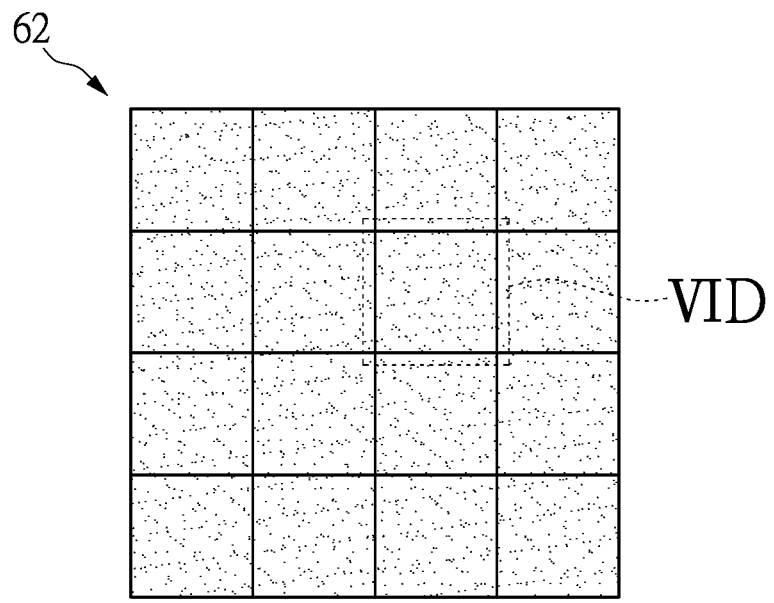
Figure 6D:
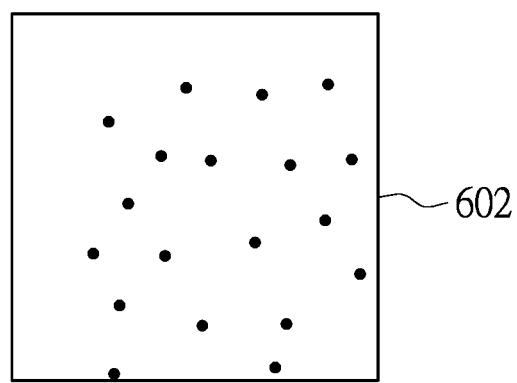
Figure 6E:
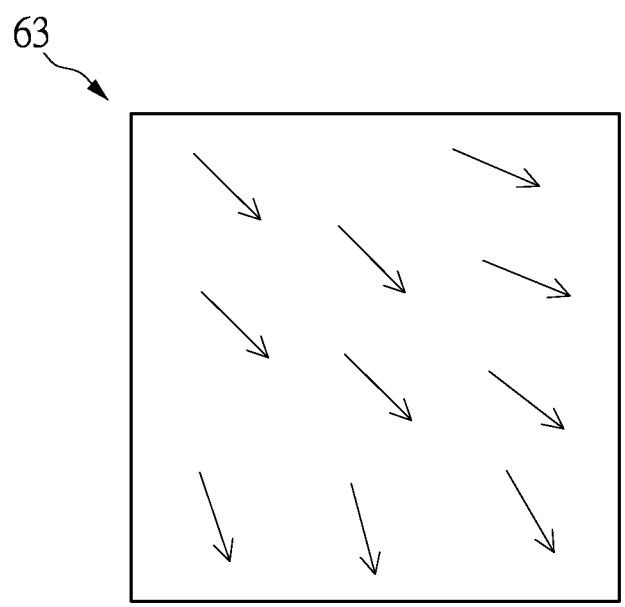

At a second time, the changes of cell activities are represented by an observation image array 62 shown in FIG. 6C. An observation image zone 601 at the first time is defined. After that, the observation image zone 601 becomes an observation image zone 602 (VID) shown in FIG. 6D at a next moment. A time difference there-between appearing on the two-dimensional coordinates allows the system to obtain changes indicative of the displacements of the feature-positioning points. A deformation vector map 63 shown in FIG. 6E is therefore created. Every vector appearing on the deformation vector map 63 indicates the displacements of the feature-positioning points from the first time to the second time and a moving direction thereof. The many vectors with arrows shown on the deformation vector map 63 are not regularly directed in the same direction. These vectors are used to describe the cell activity. In an exemplary example, the displacements of the feature-positioning points and the moving direction thereof can be represented by a time lapse video that shows a state of a plurality of observation image arrays within a period of time. The deformation vector map 63 in the observation image zone can therefore be created. The deformation vector map 63 can accurately depict the cell activity and conduct cell detection. If the deformation vector map 63 is used for screening an embryo, defects of the embryo or any applicable type of cell can be detected. The deformation vector map 63 is referred to for determining defects in the cell, and obtaining positions, shapes and sizes of the defects.

According to one embodiment of the disclosure, the cell detection method employs a digital image correlation method to compare images that change over time before and after deformation. Displacement and deformation within a region of interest (ROI) can be identified. While performing the digital image correlation method, the image before deformation is configured to be a reference image and some seed points can be configured as initial points for measuring the deformation. It should be noted that the initial points in the image are used for checking relationship among the images. The deformation over time can therefore be found within the region of interest. One or more continuous images are used in the method according to the condition and the time for forming the deformation. In the meantime, some subsets and spacing between the subsets are determined based on surface features of the specimen (e.g., the cell). The cell (e.g., an embryo) and the surface features can be a size, color and depth of the cell. The deformation of the images can be obtained by comparing the surface features with the reference image. In one embodiment of the disclosure, by a process of image analysis, an area with the most similar grayscale before and after deformation can be found within the region of interest. The displacement and a strain can be calculated. It should be noted that the strain indicates an intensity of deformation formed in the region of interest.

Figure 7:
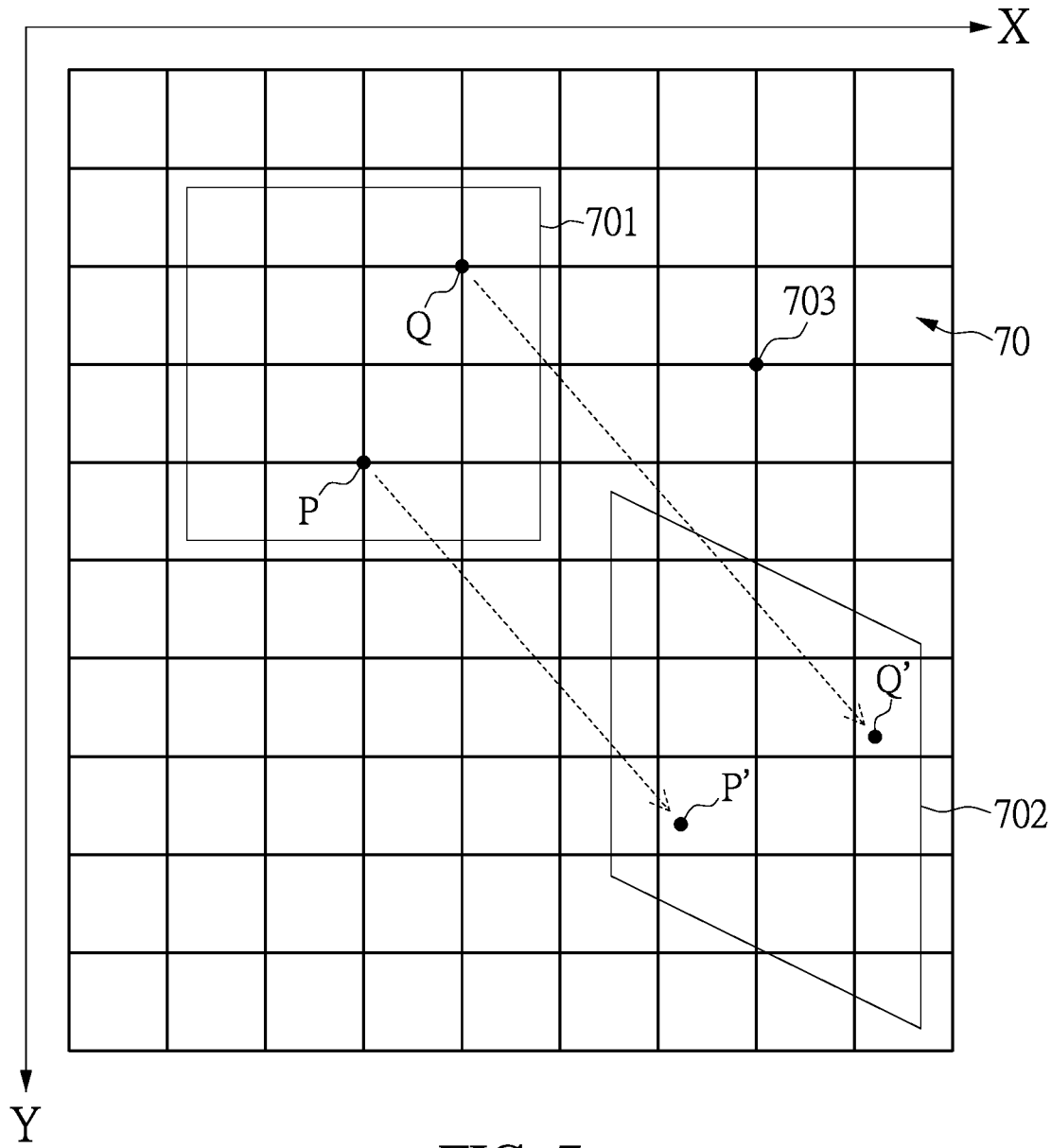
FIG. 7 is a schematic diagram depicting the digital image correlation method being used to describe changes within the observation image zone in one embodiment of the disclosure.

Reference is made to FIG. 7, which depicts an example where the digital image correlation method is used to describe the changes in the observation image zone in one embodiment of the disclosure.

In a process of cell detection, a holistic image of multiple cells created by cell division can be depicted by a coordinate system of feature-positioning points 70 shown in FIG. 7. A region of interest covering a cell and multiple split cells is selected. After that, coordinates of the multiple (at least two) feature-positioning points within every observation image zone at a first time can be obtained. A reference image with a shown first observation image zone 701 is accordingly created. For example, two feature-positioning points P and Q are shown in the cell image at the first time. It should be noted that more feature-positioning points can be used for describing the cell activity more accurately.

Referring to a reference point 703 set by the system, changes are found in the cell image at the second time. The changes are the displacement and deformation found in the cell image. The strain can also be obtained by the process of image analysis. Specifically, at the second time, feature-positioning points P' and Q' in the second observation image zone 702 are formed by referring to the feature-positioning points P and Q in the first observation image zone 701 at the first time. Thus, the changes of the plurality of feature-positioning points can be obtained before and after the second time through the observation image zones by referring to the reference image. The deformation vector map is therefore created.

More specifically, after the period of time (e.g., from the first time to the second time), the deformation vector map is created according to the changes of the plurality of feature-positioning points within the observation image zones of the observation image array. The system can obtain the cell activity over time from the deformation vector map. Lastly, by analyzing the hyperspectrum and three-dimensional image information obtained within a period of time, the changes of hyperspectrum and three-dimensional image information from the observation image zone over time are used to obtain the holistic cellular activity.

The above-mentioned image analysis technology is used to analyze a hyperspectral image of the cell in order to obtain various spectral characteristics. A model being analyzed from the hyperspectral image can be obtained. For example, a huge amount of spectral data is used to establish an artificial intelligence (AI) image database. According to one embodiment of the disclosure, in the cell detection method, the cell detection apparatus including the stereo camera module and the hyperspectrum module performs an image analysis. The cell detection apparatus captures images within a continuous wavelength band for depicting a spectrum of pixels within a region of interest. After performing spectral classification, merging and de-mixing for differentiating unused information from images of the cells within every observation image zone, image and data quality can therefore be improved. By separating and classifying the various spectral information, the technology for providing the hyperspectral image can effectively and accurately identify the spectral characteristics of the cell image since the unused information of the cell image within every observation image zone have been differentiated. The image and data quality of the cell have been improved based on the final result of the cell image and quantitative spatial analysis.

In summary, according to the embodiments of the cell detection method, apparatus and system, the cell detection apparatus uses the hyperspectrum module and the stereo camera module to retrieve hyperspectrum and three-dimensional image information of the cell(s) over time. Further, the digital image correlation method is introduced. Therefore, the displacements and deformation of the cell(s) can be accurately obtained by the non-contact optical detection technology. Still further, apart from the three-dimensional displacement being able to be obtained, the strain with stereoscopic angle can also be obtained. The changes of the cell(s) can be obtained according to the horizontal and vertical displacements and the strain. For some specific purposes, the cell detection method and the apparatus are used to obtain the positions, shapes and sizes of defects of the cells so as to screen out the embryo with strong vitality and normal genes condition. The embryo implantation rate and a live birth rate can therefore be improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A cell detection method, comprising:
    describing a process of cell division from a cell to split cells through a coordinate system of feature-positioning points and obtaining a series of continuous images within a period of time by a cell detection apparatus, wherein the cell detection apparatus includes a hyperspectrum module and a stereo camera module, and the cell detection apparatus obtains hyperspectrum and three-dimensional image information of a plurality of observation image zones of an observation image array covering the split cells from the cell via a common-path;
    obtaining coordinates of a plurality of feature-positioning points at a first time within every observation image zone so as to create a reference image;
    obtaining coordinates of the plurality of feature-positioning points at a second time within every observation image zone;
    obtaining changes of the plurality of feature-positioning points before and after the second time from the observation image zones by referring to the reference image; and
    establishing a deformation vector map according to the changes of the plurality of feature-positioning points within the plurality of observation image zones in the observation image array, and obtaining cell activity at the first time and the second time;
    wherein a holistic cellular activity is obtained according to changes of the hyperspectrum and three-dimensional image information within the plurality of observation image zones over time.

2. The method according to claim 1, wherein the cell detection apparatus captures images within a continuous wavelength band for depicting a spectrum of pixels within a region of interest, and performs spectral classification, merging and de-mixing for differentiating unused information from images of the cells within every observation image zone so as to improve image and data quality.

3. The method according to claim 1, wherein a region of interest is obtained from the images covering the cell and the split cells so as to create an image of the observation image array.

4. The method according to claim 3, wherein the cell detection apparatus captures images within a continuous wavelength band for depicting a spectrum of pixels within the region of interest, and performs spectral classification, merging and de-mixing for differentiating unused information from images of the cells within every observation image zone so as to improve image and data quality.

5. The method according to claim 3, wherein the cell activity includes displacements of the plurality of feature-positioning points and deformation of the region of interest at the first time and the second time.

6. The method according to claim 5, wherein the cell detection apparatus captures images within a continuous wavelength band for depicting a spectrum of pixels within the region of interest, and performs spectral classification, merging and de-mixing for differentiating unused information from images of the cells within every observation image zone so as to improve image and data quality.

7. The method according to claim 6, wherein the deformation vector map is referred to for determining defects in the cell and obtaining positions, shapes and sizes of the defects.

8. A cell detection apparatus, comprising:
a hyperspectrum module, used to retrieve information across electromagnetic spectrums from an image including a cell and split cells;
a stereo camera module, used to capture three-dimensional image information from the cell and the split cells; wherein the hyperspectrum module and the stereo camera module together form a trinocular micro spectrometer that conducts cell detection via a common-path; and
a microscopic optical module that is configured by structural design and a lens set, being an optical mechanism of the cell detection apparatus, and used for the hyperspectrum module and the stereo camera module to retrieve hyperspectrum and three-dimensional image information of the cell and the split cells through a lens via a common-path;
wherein the cell detection apparatus performs a cell detection method comprising:
describing a process of cell division from a cell to split cells through a coordinate system of feature-positioning points and obtaining a series of continuous images within a period of time by a cell detection apparatus, wherein the cell detection apparatus obtains hyperspectrum and three-dimensional image information of a plurality of observation image zones of an observation image array covering the split cells from the cell via a common-path;
obtaining coordinates of a plurality of feature-positioning points at a first time within every observation image zone so as to create a reference image;
obtaining coordinates of the plurality of feature-positioning points at a second time within every observation image zone;
obtaining changes of the plurality of feature-positioning points before and after the second time through the observation image zones by referring to the reference image; and
establishing a deformation vector map according to the changes of the plurality of feature-positioning points within the plurality of observation image zones in the observation image array, and obtaining cell activity at the first time and the second time;
wherein a holistic cellular activity is obtained according to changes of the hyperspectrum and three-dimensional image information within the plurality of observation image zones over time.

9. The apparatus according to claim 8, wherein the stereo camera module is a camera including a dual-lens module that is used to capture two images with a parallax, or is a camera including one lens; the stereo camera module captures an image with an angle of view by the microscopic optical module at a first position, and then captures another image with another angle of view at a second position so as to form the three-dimensional image information.

10. The apparatus according to claim 8, wherein the cell detection apparatus captures images within a continuous wavelength band for depicting a spectrum of pixels within a region of interest, and performs spectral classification, merging and de-mixing for differentiating unused information from images of the cells within every observation image zone so as to improve image and data quality.

11. The apparatus according to claim 8, wherein a region of interest is obtained from the images covering the cell and the split cells so as to create an image of the observation image array.

12. The apparatus according to claim 11, wherein the cell activity includes displacements of the plurality of feature-positioning points and deformation of the region of interest at the first time and the second time.

13. The apparatus according to claim 12, wherein the cell detection apparatus captures images within a continuous wavelength band for depicting a spectrum of pixels within the region of interest, and performs spectral classification, merging and de-mixing for differentiating unused information from images of the cells within every observation image zone so as to improve image and data quality.

14. The apparatus according to claim 13, wherein, in the cell detection method, the deformation vector map is referred to for determining defects in the cell and obtaining positions, shapes and sizes of the defects.

15. A cell detection system, comprising:
a cell detection apparatus, comprising:
a hyperspectrum module, used to retrieve information across electromagnetic spectrums from an image including a cell and split cells;
a stereo camera module, used to capture three-dimensional image information from the cell and the split cells; wherein the hyperspectrum module and the stereo camera module together form a trinocular micro spectrometer that conducts cell detection via a common-path;
a microscopic optical module that is configured by structural design and a lens set, being an optical mechanism of the cell detection apparatus, and used for the hyperspectrum module and the stereo camera module to retrieve hyperspectrum and three-dimensional image information of the cell and the split cells through a lens via a common-path; and
a computer system, in which a processor performs a cell detection method comprising:
describing a process of cell division from a cell to split cells through a coordinate system of feature-positioning points and obtaining a series of continuous images within a period of time by a cell detection apparatus, wherein the cell detection apparatus obtains hyperspectrum and three-dimensional image information of a plurality of observation image zones of an observation image array covering the split cells from the cell via a common-path;
obtaining coordinates of a plurality of feature-positioning points at a first time within every observation image zone so as to create a reference image;
obtaining coordinates of the plurality of feature-positioning points at a second time within every observation image zone;
obtaining changes of the plurality of feature-positioning points before and after the second time through the observation image zones by referring to the reference image; and
establishing a deformation vector map according to the changes of the plurality of feature-positioning points within the plurality of observation image zones in the observation image array, and obtaining cell activity at the first time and the second time;
wherein a holistic cellular activity is obtained according to changes of the hyperspectrum and three-dimensional image information within the plurality of observation image zones over time.

16. The system according to claim 15, wherein a region of interest is obtained from the images covering the cell and the split cells so as to create an image of the observation image array, and the cell activity includes displacements of the plurality of feature-positioning points and deformation of the region of interest at the first time and the second time.

17. The system according to claim 15, wherein the hyperspectrum module records data of multiple spectral channels with the same spatial resolution, and a hyperspectral image cube is formed by superposing the data of multiple spectral channels for enhancing detectability of the cell; the three-dimensional image information obtained by the stereo camera module is able to accurately measure a relative movement and deformation of the cell.

18. The system according to claim 17, wherein the stereo camera module is a camera including a dual-lens module that is used to capture two images with a parallax, or is a camera including one lens; the stereo camera module captures an image with an angle of view by the microscopic optical module at a first position, and then captures another image with another angle of view at a second position so as to form the three-dimensional image information.

19. The system according to claim 17, wherein the cell detection apparatus captures images within a continuous wavelength band for depicting a spectrum of pixels within the region of interest, and performs spectral classification, merging and de-mixing for differentiating unused information from images of the cells within every observation image zone so as to improve image and data quality.

20. The system according to claim 15, wherein the deformation vector map is referred to for determining defects in the cell and obtaining positions, shapes and sizes of the defects.

* * * * *